United States Patent [19]
Wilson

[11] Patent Number: 6,081,724
[45] Date of Patent: Jun. 27, 2000

[54] PORTABLE COMMUNICATION DEVICE AND ACCESSORY SYSTEM

[75] Inventor: Nathaniel B. Wilson, San Diego, Calif.

[73] Assignee: Qualcomm Incorporated, San Diego, Calif.

[21] Appl. No.: 08/593,305

[22] Filed: Jan. 31, 1996

[51] Int. Cl.[7] .................................................. H04Q 7/32
[52] U.S. Cl. ........................................ 455/462; 455/569
[58] Field of Search .................................. 455/403, 462, 455/465, 420, 575, 569

[56] References Cited

U.S. PATENT DOCUMENTS

| | | | |
|---|---|---|---|
| 4,369,516 | 1/1983 | Byrns | 379/359 |
| 4,654,655 | 3/1987 | Kowalski | 340/825.5 |
| 5,095,503 | 3/1992 | Kowalski | 455/403 |
| 5,365,573 | 11/1994 | Sakamoto et al. | 455/462 |
| 5,524,045 | 6/1996 | Yazawa | 455/462 |
| 5,561,712 | 10/1996 | Nishihara | 455/462 |

Primary Examiner—Dwayne D. Bost
Assistant Examiner—Myron K. Wyche
Attorney, Agent, or Firm—Russel B. Miller; Charles D. Brown; Pavel Kalousek

[57] ABSTRACT

A portable communications device and accessory system which enables both voice and control commands to be communicated between a portable communication device and external accessories over a single flexible digital interface. When the portable communication device is interfaced to external accessories, such as a power booster and hands-free kit, a microprocessor configures the serial communications bus to pass both the digital voice data and digital control commands to and from the external power booster and the hands-free kit. The external hands-free kit contains its own auxiliary CODEC for encoding analog voice signals and decoding the digital voice data. When the portable communication device is not interfaced with external accessories, the microprocessor configures the serial communication bus to pass the digital voice data to and from an internal CODEC for use with the portable device's own microphone and speaker.

10 Claims, 3 Drawing Sheets

PORTABLE COMMUNICATION DEVICE AND ACCESSORY SYSTEM

BACKGROUND OF THE INVENTION

I. Field of the Invention

The present invention relates generally to portable communication systems. More particularly, the present invention relates to novel and improved portable communications device and accessory system which provides full-duplex communications between a portable communication device and external accessories over a flexible digital interface.

II. Description of the Related Art

There are presently multiple types of cellular radiotelephone systems operating. These systems include the frequency modulated (FM) advanced mobile phone system (AMPS) and two digital cellular systems: time division multiple access (TDMA and GSM), and code division multiple access (CDMA). The digital cellular systems are being implemented to handle capacity problems that AMPS is experiencing. Dual-mode CDMA/FM radiotelephones exist which are selectively operative in either FM or CDMA modes. Telecommunications Industry Association (TIA)/ Electronic Industries Association (EIA) Interim Standard 95, entitled "Mobile Station-Base Station Compatibility Standard for Dual-Mode Wideband Spread Spectrum Cellular System" sets forth the requirements and standards for a dual-mode radiotelephone which is selectively operative in either FM or CDMA modes.

A typical portable cellular radiotelephone may be interfaced with one or more external accessories. For example, the portable telephone user may desire to use his portable radiotelephone in his car while driving, and thus interface it with a hands-free speakerphone, a power booster, and/or a voice-operated dialer. The hands-free speakerphone (or hands-free "kit") allows the user to make phone calls, via an external loudspeaker and microphone, without holding the telephone. The power booster couples radio frequency (RF) signal to and from the portable radiotelephone's own antenna, amplifying the RF signal for the higher power transmission and reception that is desirable when operating off of a car battery. A voice dialer responds to verbal commands from the user, dialing from a set of preprogrammed telephone numbers according to the voice commands. These accessories are often used at the same time as part of a car adapter kit.

In the prior art, each of these external accessories requires at least one separate interface to the portable radiotelephone. For example, consider the typical prior art portable radiotelephone accessory system illustrated in FIG. 1. The portable device 100, which could be a cellular phone, a personal communication services (PCS) phone, or similar device, comprises microphone and speaker 106, multiplexer 104, encoder/decoder (CODEC) 102, digital signal processor (DSP) 108, microprocessor 110, transceiver 112, and antenna 111.

In operation, antenna 111 receives an RF signal which is subsequently downconverted and demodulated by transceiver 112. The demodulated digital signal is passed to DSP 108 for audio-band processing, and then to CODEC 102 for conversion to an analog voice signal. For transmission, the reverse path is followed, i.e. the analog voice signal is converted to a digital signal by CODEC 102, processed by DSP 108, and passed to transceiver 112 for upconversion and modulation before transmission on antenna 111. When portable device 100 is in a portable mode (i.e. when not connected to external accessories) microprocessor 110 configures multiplexer 104 to pass the analog voice signal to and from microphone and speaker 106, which are housed in portable device 100. However, when portable device 100 is interfaced with hands-free kit 114, microprocessor 110 configures multiplexer 104 to pass the analog voice signal, over analog interface 113, to and from auxiliary microphone and speaker 116 which are housed in hands-free kit 114. In addition, when portable device 100 is interfaced with power booster 118, RF signals are received and transmitted by external antenna 120, amplified by power booster 118, and coupled to and from antenna 111 in portable device 100.

The difficulty with the prior art is encountered when one desires to pass control commands to hands-free kit 114 or power booster 118, or to control other external accessories. Since analog interface 113 carries analog voice signals, it is not suited to carry control commands to external accessories. As such, command interfaces 115, 117, are necessary to pass control commands to hands-free kit 114 and power booster 118, respectively. Commands to hands-free kit 114 may include instructions to automatically turn auxiliary microphone and speaker 116 on and off, or to automatically mute the car's installed stereo during a hands-free call. Commands to power booster 118 may include transmit and receive power control commands. Thus, as can be seen from FIG. 1, at least one separate interface 113,115,117 must be used to interface portable device 100 with each desired external accessory 114,118, adding cost and complexity.

Another difficulty with the prior art system of FIG. 1 is that when portable device 100 is interfaced with hands-free kit 114 (i.e. when operating in hands-free mode), the normal full-duplex operation of simultaneous talk and listen is suspended. This is required to prevent undesired feedback between the auxiliary speaker and microphone 116. Typically, the hands-free mode of operation is controlled by a voice-activated switch (VOX) which switches between the talk and listen paths according to the activity level of the path. If portable device 100 is operating in an FM mode, the talk and listen paths are both simultaneously enabled during hands-free operation, however the inactive path is always attenuated to prevent acoustic oscillation. If portable device 100 is operating in a digital mode, the inactive path is muted whenever active voice frames arrive from the base station. Unfortunately, the VOX switching works well only when both portable device 100 and the calling unit are in relatively quiet environments. For instance, if the caller is in a noisy public place, and the user of portable device 100 is in hands-free operation in the relative quiet of a car interior, the caller is likely to hear only broken portions of the conversation because the VOX will favor the caller's background noise over the speech of the user of portable device 100.

What is needed is a portable communication device and accessories that communicate both voice and command data over a single flexible interface, and also provides for full-duplex communication between the portable device and the accessories.

SUMMARY OF THE INVENTION

The present invention is a novel and improved portable communications device and accessory system which enables both voice and control commands to be communicated in full duplex between a portable communication device and external accessories over a single flexible digital interface. When the portable communication device is interfaced to external accessories, such as a power booster and hands-free kit, a microprocessor configures the serial communications bus to pass both the digital voice data and digital control commands to and from the external power booster and the hands-free kit. The external hands-free kit contains its own auxiliary CODEC for encoding analog voice signals and decoding the digital voice data. When the portable communication device is not interfaced with external accessories, the microprocessor configures the serial communication bus to pass the digital voice data to and from an internal CODEC for use with the portable device's own microphone and speaker.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 2:
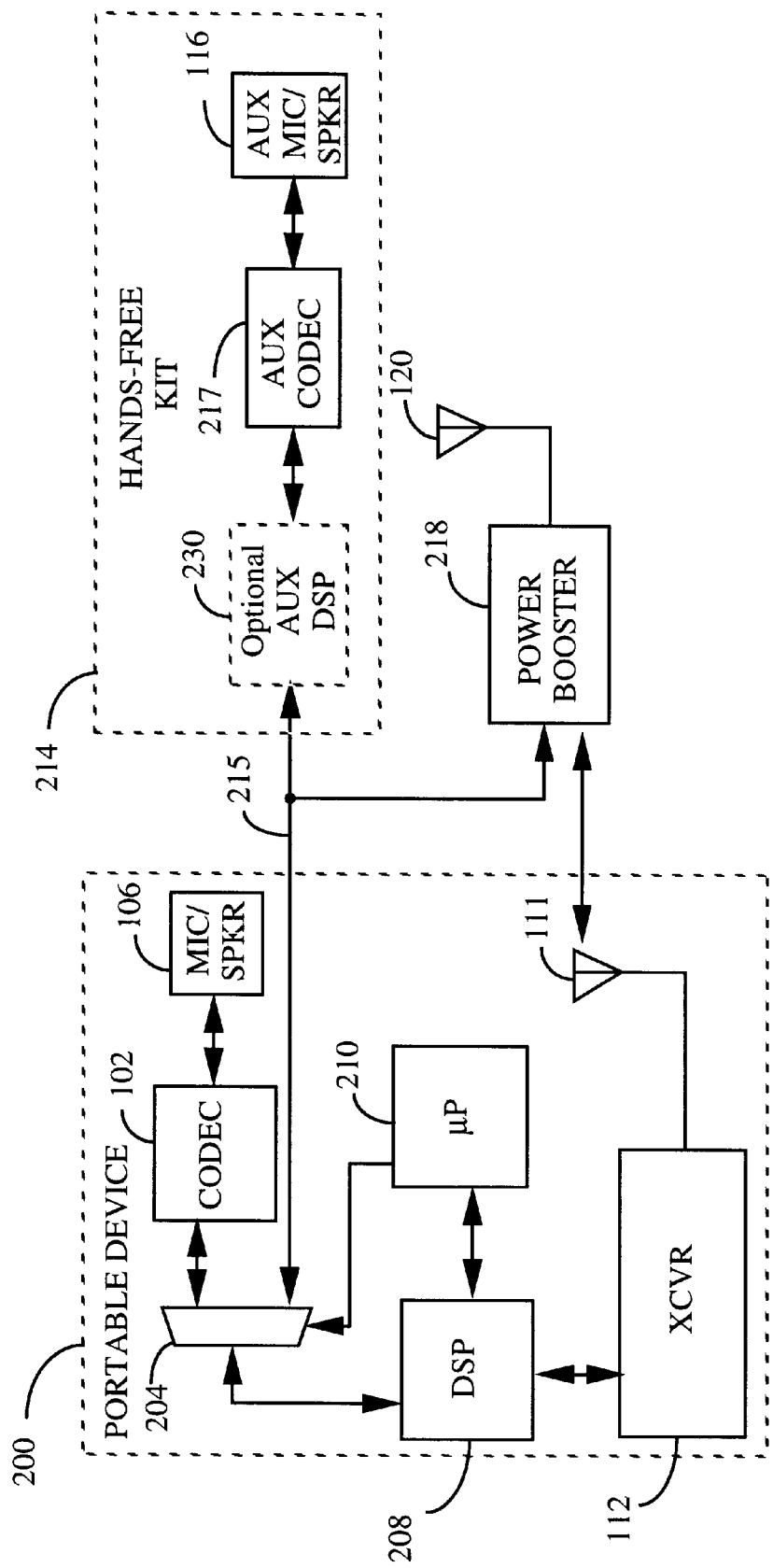
FIG. 2 is a block diagram of the portable communication device and accessory system of the present invention.

FIG. 2 illustrates a block diagram of the portable communication device and accessory system of the present invention. In the preferred embodiment, hands-free kit 214 serves as a physical "cradle" to receive portable device 200, has a mechanical hookswitch (not shown) to determine when portable device 200 is in the cradle (an "on-hook" condition) and when portable device 200 is out of the cradle (an "off-hook" condition). When portable device 200 is connected to hands-free kit 214 and is in the cradle, it switches to operating in a hands-free mode. Whenever portable device 200 is out of the cradle, it operates in a portable mode. Portable device 200 may also be interfaced with hands-free kit 214, but still out of the cradle (i.e. off hook).

Figure 1:
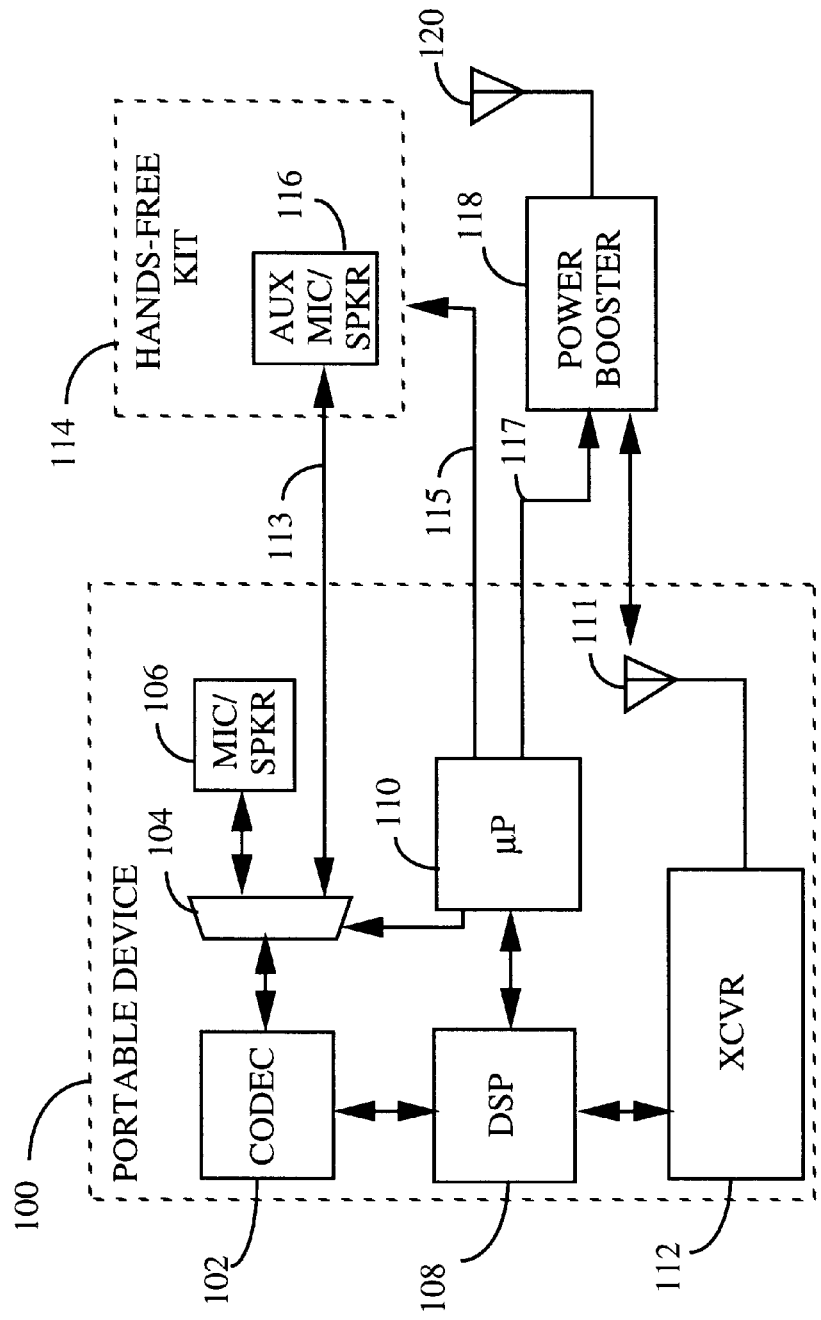
FIG. 1 is a block diagram of a prior art portable communication device and accessory system.

Antenna 111, transceiver 112, CODEC 102, and microphone and speaker 106 of FIG. 2 operate as described with reference to FIG. 1. However, in the present invention, microprocessor 210 configures serial communication bus multiplexer 204 to pass digital voice data between DSP 208 and either CODEC 102 or auxiliary CODEC 217 in hands-free kit 214, respectively. When portable device 200 is operating in a portable mode (i.e. when it is either not connected to hands-free kit 214, or is connected to hands-free kit 214 but out of the cradle), microprocessor 210 configures serial communication bus multiplexer 204 to pass digital voice data between DSP 208 and CODEC 102. When portable device 200 is operating in a hands-free mode (i.e. when it is connected to hands-free kit 214 and in the cradle), microprocessor 210 configures serial communication bus multiplexer 204 to pass both digital voice data and control commands between DSP 208 and auxiliary CODEC 217 over digital interface 215. Control commands intended for power booster 218, or for an additional external accessory, such as a voice dialer (not shown) are also sent along with the digital voice data over digital interface 215. In this manner, a single flexible interface between portable communication device 200 and external accessories 214, 218 is accomplished which reduces the complexity of the interface over the prior art of FIG. 1. It should be noted that the serial communication bus multiplexer 204 of the present invention is better suited to implementation using silicon VLSI techniques than is the analog multiplexer 104 (see FIG. 1) of the prior art.

In the preferred embodiment, CODEC 102 and auxiliary CODEC 217 convert an analog voice signal to pulse-code modulated (PCM) digital format. Optionally, the PCM format may be a compressed μ-law or a-law format, or two's-complement linear format.

Figure 3:
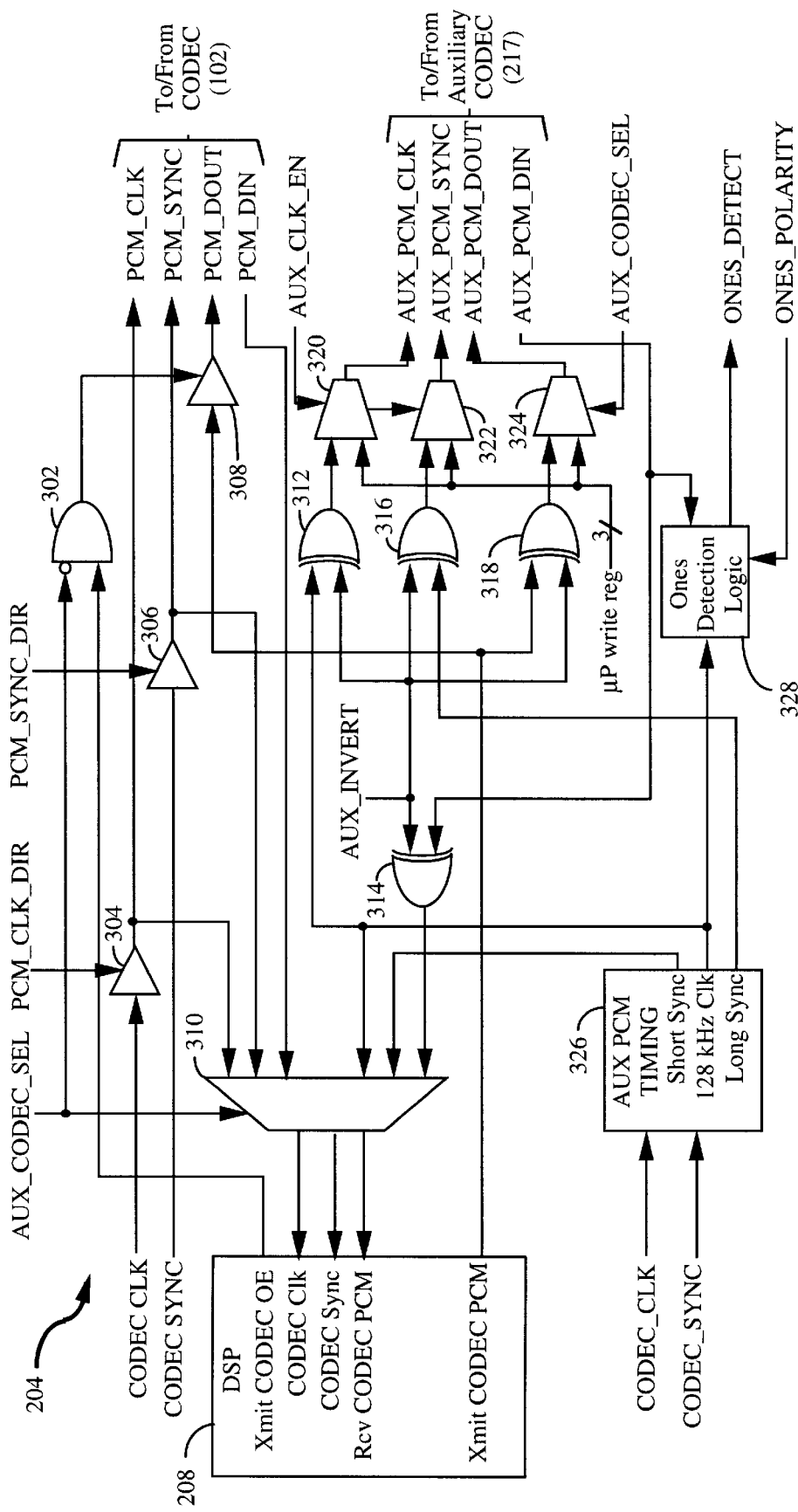
FIG. 3 is a logical diagram of the serial communication bus multiplexer of the present invention.

FIG. 3 illustrates the preferred embodiment of the serial communication bus multiplexer 204, which multiplexes PCM data between DSP 208, CODEC 102, and auxiliary CODEC 217 under control of microprocessor 210. In the preferred embodiment, serial communication bus provides a 128 kbps path in full-duplex, allocated as 64 kbps for PCM audio and 64 kbps for commands to the accessories.

In operation, DSP 208 sets XMIT_CODEC_OE high to enable PCM data output, and drives PCM data out on the signal XMIT_CODEC_PCM to tri-state buffer 308 and through exclusive-or (XOR) gate 324, which provides selectable signal polarity, to multiplexer 324. When portable device 200 is in a portable mode (i.e. off hook), microprocessor 210 sets AUX_CODEC_SEL low, enabling AND gate 302 and tri-state buffer 308, thus driving PCM data out to CODEC 102 on the PCM_DOUT line. When AUX_CODEC_SEL is low, multiplexer 310 switches to accept data from CODEC 102 over the PCM_DIN line. Additionally, microprocessor 210 sets PCM_CLK_DIR and PCM_SYNC_DIR high to enable tri-state buffers 304 and 306, thus enabling clock and sync signals to CODEC 102.

Furthermore, by setting AUX_CODEC_SEL low, microprocessor 210 switches multiplexer 324 to disable PCM data from being driven out to auxiliary CODEC 217 on the AUX_PCM_DOUT line. Optionally, microprocessor 210 may set AUX_CLK_EN low to switch multiplexers 320 and 322, thus disabling clock and sync signals to auxiliary CODEC 217.

When the portable device 200 is operating in hands-free mode (i.e. in the cradle), microprocessor 210 sets AUX_CODEC_SEL high, switching multiplexer 324 to pass PCM data from DSP 208 through XOR gate 318 out on the AUX_PCM_DOUT line to auxiliary CODEC 217. When AUX_CODEC_SEL is high, multiplexer 310 switches to accept data from auxiliary CODEC 217 over the AUX_PCM_DIN line. Additionally, microprocessor 210 sets AUX_CLK_EN high, switching multiplexers 320 and 322 to provide clock and sync signals to auxiliary CODEC 217.

Furthermore, by setting AUX_CODEC_SEL high, microprocessor 210 disables AND gate 302 and tri-state buffer 308, thus preventing PCM data from being driven out on the PCM_DOUT line to CODEC 102. Optionally, microprocessor 210 may set PCM_CLK_DIR and PCM_SYNC_DIR low, disabling tri-state buffers 304 and 306, and thus disabling clock and sync signals to CODEC 102.

Auxiliary PCM timing generator 326 provides the clock and sync signals used by DSP 208, and auxiliary CODEC 217 to transfer synchronized audio data. The transceiver 112 (see FIG. 1) generates the signals CODEC_CLK and CODEC_SYNC so that CODEC 102, DSP 208 and auxiliary PCM timing generator 326 will operate synchronously with respect to the rest of the system. The clock signal is used for demarking each bit of serial data through serial communication bus multiplexer 204, whereas the sync signal is used to align DSP 208 and CODEC 102 or auxiliary CODEC 217 to the start of each audio sample word. In the preferred embodiment, CODEC 102 uses a clock signal of 2.048 Mhz. However, auxiliary CODEC 217 utilizes a 128 kHz clock signal, which is better suited to send down a long cable (not shown) which may connect hands-free kit 214 with portable device 200. In order to interface with common types of auxiliary CODEC 217, a "Long Sync" signal is provided to auxiliary CODEC 217 which is a 50% duty cycle, 8 kHz synchronization signal. This "Long Sync" format is supported by many CODECs which are commercially available.

Additionally, in many cases, a long cable run (not shown) may exist between portable device 200 and hands-free kit 214. Such a long cable run may introduce the need for a Schmitt-trigger receiver (not shown) to recondition the digital signals. A typical Schmitt-trigger receiver introduces an undesirable signal inversion. As such, the present invention provides for data inversion controlled by microprocessor 210 via the AUX_INVERT signal. When AUX_INVERT is high XOR gates 312,316, and 318, invert the 128 kHz clock signal, the long sync signal, and the output PCM data from DSP 208, respectively, for use with auxiliary CODEC 217. Additionally, the PCM data from auxiliary CODEC 217 to DSP 208 is inverted by XOR gate 314.

Ones detection logic 328 indicates to microprocessor 210, via the signal ONES_DETECT, whether portable device 200 is interfaced with hands-free kit 214 in the portable mode (i.e. off hook) or in the hands-free mode (i.e. on hook). As previously mentioned, when portable device 200 is in the cradle, auxiliary CODEC 217 drives PCM data to DSP 208 on the AUX_PCM_DIN line. However, when portable device 200 is out of the cradle, but still interfaced with hands-free kit 214, auxiliary CODEC 217 drives out a series of logical zeroes on the AUX_PCM_DIN line, which may be logical ones if polarity inversion is used. The stream of ones (or zeroes) is input to ones detection logic 328. When ones detection logic 328 detects this stream of incoming ones (or zeroes), it sets ONES_DETECT high, notifying microprocessor 210 to switch to the internal CODEC 102. As previously stated, these ones are not passed to DSP 208 because they are switched out by multiplexer 310 under control of AUX_CODEC_SEL. This allows the user to hold portable device 200 normally, having a private conversation, while still being able to take advantage of the higher power transmission and reception provided by power booster 218.

Another advantage of the present invention is that since the interface between portable device 200 and hands-free kit 214 is a digital interface in full-duplex, audio processing of the echoes induced by hands-free operation may be conveniently implemented in DSP 208. This allows a full-duplex conversation when in the hands-free mode rather than having to mute the non-active path as required by the prior art. Alternatively, a optional auxiliary DSP 230 may be included in hands-free kit 214, enabling both echo-canceling and voice-activated dialing to be performed internally to hands-free kit 214 itself. In sharp contrast, the prior art system of FIG. 1, without the serial communication bus multiplexer 204 of the present invention, would require two auxiliary CODECs (not shown) and an auxiliary DSP (not shown) to accomplish the same task.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A communication system having a portable mode and a non-portable mode, said communication system comprising:

a portable communication device for transmitting and receiving a communication signal, said portable communications device having a digital communication bus; and at least one external accessory, coupled to said digital communications bus, said digital communications bus for exchanging digital audio data and control commands between said portable communication device and said at least one external accessory in full duplex when in said non-portable mode.

2. The communication system of claim 1 further comprising:

a digital signal processor, in said portable communication device and coupled to said digital communication bus, for digitally processing said communication signal;

a primary encoder/decoder, in said portable communication device and coupled to said digital communication bus, for converting said communication signal between a digital format and an analog format when in said portable mode;

an auxiliary encoder/decoder, in said at least one external accessory and coupled to said digital communication bus, for converting said communication signal between said digital format and said analog format when in said non-portable mode; and a microprocessor, in said portable communication device and coupled to said digital communication bus, for configuring said digital communication bus to exchange said communication signal between said digital signal processor and said auxiliary encoder/decoder when in said non-portable mode, and for configuring said digital communication bus to exchange said communication signal between said digital signal processor and said primary encoder/decoder when in said portable mode.

3. The communication system of claim 2 wherein said at least one external accessory comprises a plurality of external accessories, said plurality of external accessories comprising:

a hands-free kit having a microphone, a speaker, and a hookswitch, said hands-free kit for receiving said portable communication device when in said non-portable mode, said hookswitch for generating an on-hook condition signal when in said non-portable mode and an off-hook condition when in said portable mode; and a power booster for amplifying said communication signal.

4. The communication system of claim 3 wherein said digital communication bus comprises:

a plurality of multiplexers, for switching said communication signal between said digital signal processor and said primary encoder/decoder when in said portable mode, and for switching said communication signal between said digital signal processor and said auxiliary encoder/decoder when in said non-portable mode;

a detection circuit, for detecting said on-hook condition signal and said off-hook condition signal; and a timing circuit, for distributing a clock signal and a synchronization signal to said digital signal processor, said primary encoder/decoder, said auxiliary encoder/decoder, and said detection circuit.

5. A portable radiotelephone for transmitting and receiving a communication signal, said portable radiotelephone having a portable mode and a non-portable mode, said portable radiotelephone interfacing with at least one external accessory when in said non-portable mode, said portable radiotelephone comprising:

a digital signal processor, for digitally processing said communication signal;

a digital communication bus, coupled to said digital processor, for exchanging said communication signal with a primary encoder/decoder when in said portable mode and with said at least one external accessory when in said non-portable mode; and a microprocessor, coupled to said digital signal processor and said digital communication bus, for configuring said digital communication bus to exchange said communication signal between said digital signal processor and said at least one external accessory when in said non-portable mode, and for configuring said digital communication bus to exchange said communication signal between said digital signal processor and said primary encoder/decoder when in said portable mode.

6. The portable radiotelephone of claim 5 wherein said at least one external accessory comprises a hands-free kit having a microphone, a speaker, and a hookswitch, said hands-free kit for receiving said portable communication device when in said non-portable mode, said hookswitch for generating an on-hook condition signal when in said non-portable mode and an off-hook condition when in said portable mode, and wherein said digital communication comprises:

a plurality of multiplexers, for switching said communication signal between said digital signal processor and said primary encoder/decoder when in said portable mode, and for switching said communication signal between said digital signal processor and said hands-free kit when in said non-portable mode;

a detection circuit, for detecting said on-hook condition signal and said off-hook condition signal; and a timing circuit, for distributing a clock signal and a synchronization signal to said digital signal processor, said primary encoder/decoder, said hands-free kit, and said detection circuit.

7. A method of exchanging data between a portable communication device and at least one external accessory in a communication system having a portable mode and a non-portable mode, said portable communication device transmitting and receiving a communication signal, said method comprising the steps of:

generating, in said portable communication device, accessory control commands when in said non-portable mode; and digitally exchanging said accessory control commands and said communication signal between said portable communication device and said at least one external accessory over a full-duplex digital communication bus when in said non-portable mode.

8. The method of claim 7 further comprising the steps of:

digitally processing said communication signal;

converting, in said portable communication device, said communication signal between a digital format and an analog format when in said portable mode;

converting, in said at least one external accessory, said communication signal between said digital format and said analog format when in said non-portable mode;

configuring said digital communication bus to exchange said communication signal between said portable communication device and said at least one external accessory when in said non-portable mode.

9. The method of claim 8 wherein said at least one external accessory comprises a hands-free kit having a microphone, a speaker, and a hookswitch, the method further comprising the steps of:

generating, in said hands-free kit, an on-hook condition signal when in said non-portable mode and an off-hook condition when in said portable mode; and providing said on-hook condition signal and said off-hook condition signal to said portable communication unit.

10. The method of claim 9 further comprising the steps of:

detecting, in said portable communication device, said on-hook condition and said off-hook condition; and switching said communication signal between said portable communication device and said hands-free kit when said on-hook condition signal is detected.

\* \* \* \* \*